1,438,639

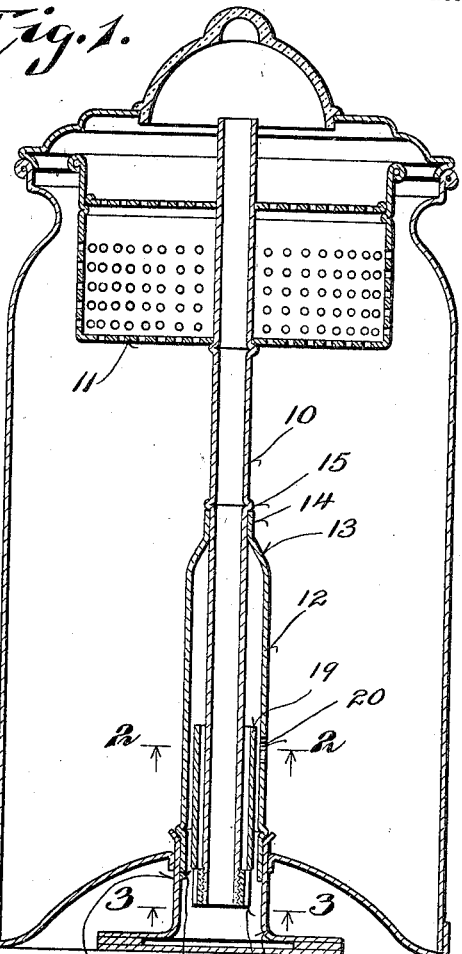
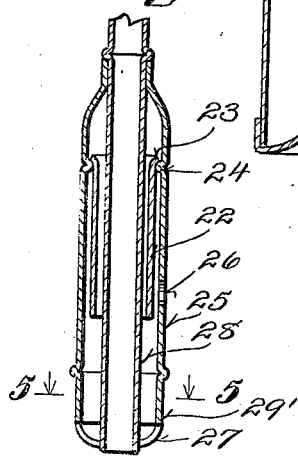
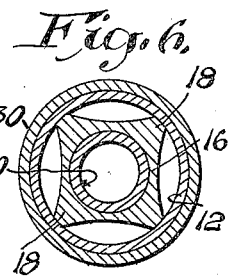
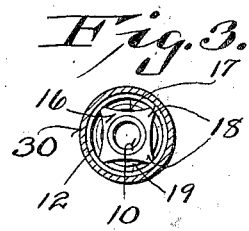
W. H. ELLIS AND J. KOENIG.
PERCOLATOR.
APPLICATION FILED APR. 4, 1922.
1,438,639. Patented Dec. 12, 1922.
Inventors
Joseph Koenig
William H. Ellis Patented Dec. 12, 1922.

UNITED STATES PATENT OFFICE.

WILLIAM H. ELLIS AND JOSEPH KOENIG, OF TWO RIVERS, WISCONSIN.

PERCOLATOR.

Application filed April 4, 1922. Serial No. 549,423.

*To all whom it may concern:*

Be it known that we, WILLIAM H. ELLIS and JOSEPH KOENIG, both citizens of the United States, and residents of Two Rivers, in the county of Manitowoc and State of Wisconsin, have invented certain new and useful Improvements in Percolators; and we do hereby declare that the following is a full, clear, and exact description thereof.

The invention relates to percolators for coffee-pots.

It comprises, in addition to the coffee-pot and the apertured receptacle therein for the coffee, an elongated tube and a shoulder tube of larger diameter having a slipping contact at its top with the longer tube, a nut, or similar means for spacing the lower end of the outer tube from the inner tube, and a sleeve supported by the nut and movable to close or open an orifice in the side of the larger tube.

A primary object of the invention is the promoting of a more efficient percolating action, the outer tube operating to prevent an undue cooling off of the heated liquid in the inner tube and the valve serving to admit the liquid in proper quantities to the heater, so that a small quantity of the coffee is subjected to a concentrated heating action, which causes the liquid to rise rapidly in the inner tube, producing a percolating action.

Very important advantages lie in the especially economical manner of manufacture. The outer tube is in merely slip-end connection with the inner tube, this connection operating to prevent ingress or egress of the fluid at the point of connection, but serving to maintain the top outer tube in fixed close contact with the inner tube. This structure facilitates ready assemblage of parts and is especially easy to manufacture. The lower end of the outer tube is spaced from the lower end of the inner tube, the surface of the nut permitting the feeding of coffee into the heater in proper quantities, the ends of the nut contacting with the outer tube and maintaining it rigid with the inner tube, so that there is no relative movement of the two elements. This structure is very easy to manufacture, as it calls merely for the threading of the inner tube and the assemblage of a nut thereon, and the parts are durable.

In addition to its spacing action, the nut serves, also, as a support for the sleeve, which is operative to feed the liquid through the opening in the outer tube in proper quantities, so that a desirable percolating action results. This structure is very easy to manufacture and the parts are readily assembled, a sleeve resting on the nut and being operable by the movement of the fluid to move in such manner as to cover the opening or uncover it. The inner and outer tube present substantially smooth surfaces so that there is nothing to interfere with the movements of the sleeve, which is at all times operative and effective to perform its functions.

With the above and other objects in view, which will appear as the description proceeds, our invention resides in the novel construction, combination and arrangement of parts, substantially as hereinafter described and more particularly defined by the appended claims, it being understood that such changes in the precise embodiment of the herein disclosed invention may be made as come within the scope of the claims.

In the accompanying drawing, we have illustrated one complete example of the physical embodiment of the present invention constructed according to the best mode we have so far devised for the practical application of the principles thereof, and in which:

Figure 1 is a central, vertical section of the invention as applied to a coffee-pot.

Figures 2 and 3 are horizontal sections thereof on the lines 2—2 and 3—3, respectively, of Figure 1.

Figure 4 is a centrally vertical, sectional view of the modification, and

Figure 5 is a horizontal cross-section on the line 5—5 of Figure 4.

Figure 6 is a horizontal section on the line 6—6 of Figure 1.

The inner tube 10 is elongated and cooperates in the customary manner with the receptacle 11 containing the coffee grounds. Outer tube 12 is somewhat shorter than the inner tube 10 and at 13 is depressed inwardly to provide a neck 14 adapted to maintain a slip-fit connection with inner tube 10. The slip-fit connection permits ready assemblage of the tubes and in their relationship shown prevents movement of the tubes relative to each other, and the feeding of liquid from one tube to the other. If desired, a deformation 15 may be provided against which the neck 14 may rest.

Nut 16 is threaded on the lower end of inner tube 10 and is provided with cut-away sides 17 and corners 18. The corners contact with outer tube 12 and maintain the tubes in proper spaced relation. The cutaway sides permit the flow of water between the tubes. Sleeve 19 rests on nut 16 and is freely movable with respect thereto, being limited in its oscillations by the inner tube and the enveloping outer tube 12. Orifice 20 in the outer tube is adapted to be closed or opened by sleeve 19, moving laterally under impulse of the expanding steam rising within the sleeve. When open, it permits water to flow into the heater 21.

It will be noted that sleeve 19 does not operate to totally close opening 20 in such wise as to create danger of drying out the lower portions in which the percolating action is initiated. The heater is not permitted to become entirely dry, because the pressure of the liquid about tube 12 operates through aperture 20, and is effective to move sleeve 19 laterally so that the liquid is conveyed to the heater. It is therefore apparent that the provision of the sleeve does not create danger of burning out the heater. Sleeve 19 is effective, however, to retard the percolating action. It tends to retard the inflow of cooler fluid. The rapid inflow of cooler fluid is undesirable, as it slows up the rise in temperature of the liquid in heater 21. Sleeve 19 may be moved laterally under certain conditions by the liquid coming through opening 20. It is also laterally movable as the result of agitation and vibration resulting from the percolating action. The process of percolation is substantially the occurrence of a sequence of explosions. The shock of these explosions is sufficient to displace sleeve 19, which rests lightly upon nut 16.

It is not essential that the specific nut shown should be used for spacing the tubes apart at their lower ends, but a valve may be provided, such as tube 22 shown in Figure 4, which may be flared at 23 to rest on a bead 24 on outer tube 25 having an opening 26 therein. Lugs 27 on outer tube 25 may be directed inwardly against inner tube 28 preventing lateral movement of either tube with respect to the other.

In a modification of the invention, outer tube 12, or outer tube 25, have a slip-fit connection at 29—29' with heater tube 30. This permits a ready assemblage and separation of parts.

We claim:—

1. In a percolator, the combination of a heater, a heater tube, an elongated inner tube extending into said heater tube, an outer tube enveloping said inner tube and connected by a slip-fit to said heater tube, and a sleeve between said inner tube and said outer tube.

2. In a percolator, the combination of an outer tube, an inner tube, a sleeve between said tubes, said outer tube having an aperture therein adapted to be closed and opened by said sleeve, and a heater tube having a slip-fit with said outer tube.

3. In a percolator, an inner tube, an outer tube secured to said inner tube at the top of said outer tube by an air-tight fit, a sleeve between said tubes, an aperture in said outer tube, and means supporting said sleeve between said tubes and permitting the lateral play of said sleeve at one end.

4. In a percolator, the combination of an inner tube, an outer tube, the top of said outer tube being fitted closely to said inner tube, and a nut on said tube spacing said tubes apart at their lower ends, said nut permitting the flow of liquid between said tubes.

In testimony that we claim the foregoing we have hereunto set our hands at Two Rivers, in the county of Manitowoc and State of Wisconsin.

WM. H. ELLIS.
JOSEPH KOENIG.